(12) United States Patent
Nagalla et al.

(10) Patent No.: US 8,195,535 B2
(45) Date of Patent: Jun. 5, 2012

(54) AIRCRAFT MRO MANAGER

(75) Inventors: Dinakara Nagalla, Woodbury, MN (US); Kevin Stoltzfus, Barnum, MN (US)

(73) Assignee: Sinex Aviation Technologies, Duluth, MN (US)

( * ) Notice: Subject to any disclaimer, the term of this patent is extended or adjusted under 35 U.S.C. 154(b) by 860 days.

(21) Appl. No.: 12/256,183

(22) Filed: Oct. 22, 2008

(65) Prior Publication Data

US 2010/0100271 A1    Apr. 22, 2010

(51) Int. Cl.
*A01K 5/02* (2006.01)
(52) U.S. Cl. ............... 705/29; 705/28; 705/35; 705/305; 705/8; 701/29; 340/958
(58) Field of Classification Search .............. 705/29, 705/28, 7.38, 7.15, 35, 305; 701/35, 29; 340/958, 945
See application file for complete search history.

(56) References Cited

U.S. PATENT DOCUMENTS

| | | | |
|---|---|---|---|
| 5,454,074 A | 9/1995 | Hartel et al. | |
| 5,778,381 A | 7/1998 | Sandifer | |
| 5,828,969 A | 10/1998 | Chamney et al. | |
| 6,003,808 A | 12/1999 | Nguyen et al. | |
| 6,006,171 A | 12/1999 | Vines et al. | |
| 6,067,486 A | 5/2000 | Aragones et al. | |
| 6,125,312 A | 9/2000 | Nguyen et al. | |
| 6,150,959 A | 11/2000 | Germanetti | |
| 6,173,159 B1 | 1/2001 | Wright et al. | |
| 6,246,320 B1 | 6/2001 | Monroe | |
| 6,246,341 B1 | 6/2001 | Germanetti | |
| 6,418,361 B2 | 7/2002 | Sinex | |
| 6,442,459 B1 | 8/2002 | Sinex | |
| 6,571,158 B2 | 5/2003 | Sinex | |
| 6,580,982 B2 | 6/2003 | Sinex | |
| 6,598,940 B2 | 7/2003 | Sinex | |
| 6,606,546 B2 | 8/2003 | Sinex | |
| 6,671,593 B2 * | 12/2003 | Sinex ............................ | 701/29 |
| 6,684,136 B2 | 1/2004 | Sinex | |
| 6,691,006 B2 | 2/2004 | Sinex | |
| 6,751,536 B1 | 6/2004 | Kipersztok et al. | |
| 6,795,758 B2 | 9/2004 | Sinex | |
| 6,799,187 B2 | 9/2004 | Beggs et al. | |
| 6,826,461 B2 | 11/2004 | Sinex | |
| 6,868,319 B2 | 3/2005 | Kipersztok et al. | |
| 6,901,318 B1 | 5/2005 | Morronigiello et al. | |
| 7,124,059 B2 | 10/2006 | Wetzer et al. | |

(Continued)

*Primary Examiner* — Vanel Frenel
(74) *Attorney, Agent, or Firm* — Kinney & Lange, P.A.

(57) ABSTRACT

Electronic aircraft maintenance, repair and overhaul (MRO) tools that improve an organizations ability to manage nearly every phase of an aircraft maintenance visit. MRO management may be implemented at the single aircraft level all the way up to the organization level including several facilities each of which include several aircrafts. The disclosed MRO management solutions assist with mapping out short term and long term planning; including manpower and material and tooling requirements. Additionally, current and future workloads may be identified and considered in advance of maintenance execution to significantly improve stakeholder satisfaction. The methods and systems disclosed generate an electronic contract based on a bill of work to control maintenance task execution, report progress of executing the tasks, and process scope changes to the bill of work and the associated contract. Improved communication of financial milestones and timely closure of both maintenance work and billing processes is facilitated by generating billing invoices and processing electronic approvals based on the electronic contract and the bill of work. Customer flexibility is improved by providing standalone management tools, as well as integration with existing external systems. Additional features include supply chain management and tooling controls necessitated by growing regulatory demands.

35 Claims, 4 Drawing Sheets

U.S. PATENT DOCUMENTS

| | | |
|---|---|---|
| 7,130,825 B2 * | 10/2006 | Vlahoplus et al. .............. 705/37 |
| 7,167,786 B2 | 1/2007 | Sinex |
| 7,209,814 B2 | 4/2007 | Kipersztok et al. |
| 2002/0030609 A1 * | 3/2002 | Baumgartner et al. ....... 340/958 |
| 2003/0065549 A1 * | 4/2003 | Hoffman et al. ................ 705/10 |
| 2003/0109973 A1 * | 6/2003 | Hensey et al. .................. 701/35 |
| 2008/0005617 A1 * | 1/2008 | Maggiore et al. ............... 714/30 |
| 2009/0157532 A1 * | 6/2009 | Shiner et al. ................... 705/28 |

* cited by examiner

AIRCRAFT MRO MANAGER

BACKGROUND

The present invention relates to the field of maintenance. More specifically, the present invention relates to systems for and methods of managing aircraft maintenance, repair, and overhaul.

Aircraft maintenance occupies a key position in airline operation because such maintenance is essential to the safety of passengers and the reliability of airline schedules. Each aircraft has its own maintenance requirements which are designed to keep the aircraft in an airworthy condition. These aircraft maintenance requirements typically originate from the aircraft's manufacturer, and can be revised throughout the life of the aircraft by the aircraft manufacturers, the Federal Aviation Administration (FAA) and/or the Maintenance Review Board (MRB). Additionally, maintenance personnel may, under certain circumstances, change the schedule of these requirements by "escalating" or extending the interval at which a maintenance task is accomplished.

These aircraft maintenance requirements are documented in aircraft-specific MRB documents. An MRB document details each task that must be accomplished on a particular aircraft, the requirements of that task, and the frequency with which the task must be performed. The MRB document includes tasks that need to be accomplished anywhere from once a day to once every 20 years, as well as tasks that need to be accomplished after the aircraft has achieved a specific number of flight hours, flight cycles or other triggering aircraft use metrics. For most major aircraft types, the MRB document lists somewhere between 800 to 2,000 different tasks.

The MRB document details a very complicated maintenance schedule. To ensure compliance with the MRB document, airlines must implement various tracking programs to monitor for the dates when tasks come due, as well as to log the completion of those tasks and any corrective actions taken.

Because an aircraft produces revenue only when it is flying, it is essential for airline management to keep maintenance time at a minimum. Thus, airlines commonly group tasks together (into letter-checks) rather than perform the tasks one at a time as they come due. Letter checks commonly include "A checks", "B checks", "C checks" and "D checks", with A checks occurring most frequently and having the fewest number of tasks. A and B checks typically can be performed overnight in a "line maintenance" environment, in which, assuming no complications arise, the aircraft typically loses little or no flight time. In this environment, the aircraft remains airworthy because it can be reassembled quickly. Conversely, C and D checks comprise a greater number of tasks, many of which require a substantial amount of time to complete. Thus C and D checks are typically performed in a heavy maintenance environment in which the aircraft is taken out of service. In this environment, an aircraft is taken into a hangar, where it is taken apart, inspected, fixed and reassembled during the course of one week to over a month.

Aircraft maintenance, whether line or heavy maintenance, is a costly, labor intensive and complex process. Airlines therefore often outsource much or all of their aircraft "maintenance, repair, and overhaul" (MRO) to third party companies. Because of the high cost of aircraft maintenance and generally low airline margins, the airlines commonly select MROs, as they are commonly known, based in large part on cost. Airlines also commonly switch from one MRO to another if a lower cost option presents itself. These factors combine to produce a low margin and highly competitive aircraft MRO industry. MROs are therefore persistently in need of solutions that will increase their efficiency, which in turn may act to drive down costs and increase profit margins.

SUMMARY

A computer implemented method of managing maintenance, repair, and overhaul (MRO) of an aircraft includes generating an electronic contract based on a bill of work including maintenance tasks to be performed on the aircraft, reporting progress of execution of the bill of work, processing, as necessary, changes to the electronic contract necessitated by the execution of the bill of work, and generating invoices based on the electronic contract and the bill of work.

DETAILED DESCRIPTION

Figure 1:
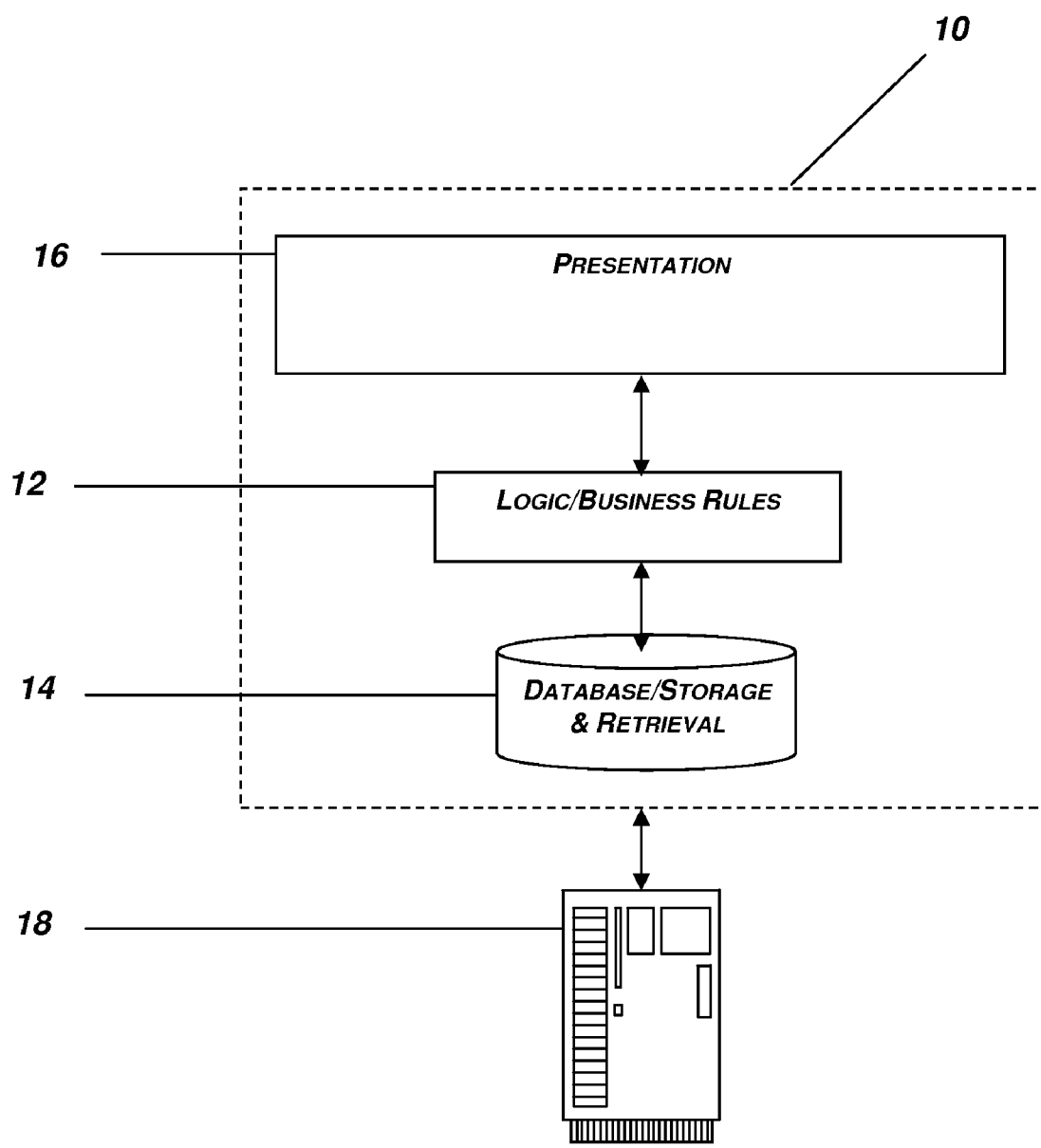
FIG. 1 is an architectural diagram illustrating an MRO management system.

FIG. 1 is an architectural diagram illustrating Maintenance Repair and Overhaul (MRO) management system 10 according to the present invention, which system includes logic layer 12, database layer 14, and presentation layer 16. System 10 includes logic layer 12, which may include one or more software programs, components, stored procedures, etc. configured to implement business rules related to managing MRO of an aircraft. Communicating data necessary for system 10 to and from logic layer 12, and in some embodiments to presentation layer 16, is database layer 14. Database layer 14 may include off-the-shelf or proprietary databases or any other storage and retrieval mechanisms appropriate for use with system 10. Presentation layer 16 may include one or more interfaces, such as a graphical user interface (GUI), configured for user interaction with system 10. Presentation layer 16 may be configured for user interaction through, for example, operating system applications, such as a Microsoft Windows application, and through applications configured to run in a web browser, such as Microsoft Internet Explorer, Netscape Navigator, Apple Safari, or Mozilla Firefox. MRO management system 10 may be a stand-alone system configured to carry out methods according to the present invention (described in detail with reference to FIG. 2 below) for managing MRO of an aircraft, or may be configured to interface with one or more external systems 18, which may include one or more electronic systems external to system 10, such as supply chain management systems for managing maintenance materials and tooling and production control systems for managing execution of a bill of work.

Figure 2:
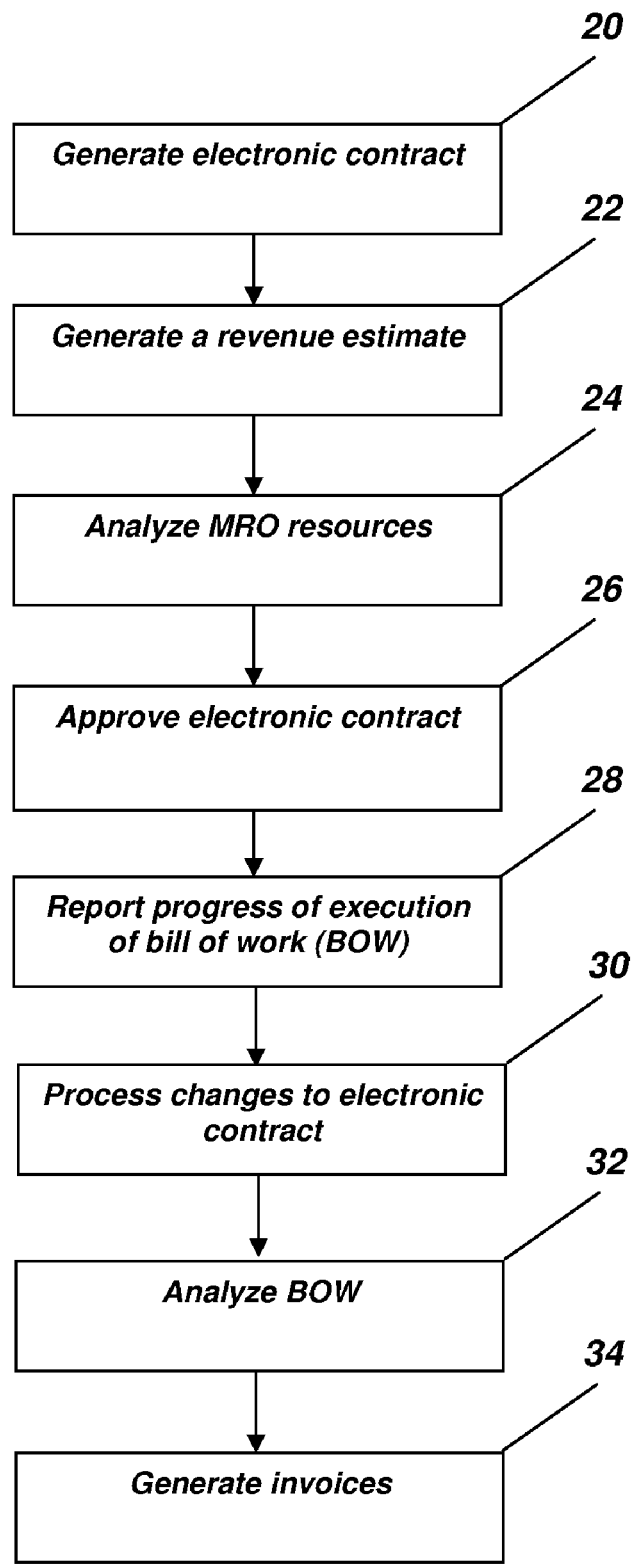
FIG. 2 is a flow chart illustrating functions carried out by the MRO management system illustrated in FIG. 1.

FIG. 2 is a flow chart illustrating functions carried out by MRO management system 10 including generating an electronic contract based on a bill of work including maintenance tasks to be performed on an aircraft (step 20), generating a revenue estimate for the bill of work based on the electronic contract (step 22), analyzing MRO resources to increase utilization on the bill of work (step 24), approving the electronic contract (step 26), reporting progress of execution of the bill of work (step 28), processing changes to the electronic contract necessitated by the execution of the bill of work (step 30), analyzing the bill of work during and after execution to produce one or more performance metrics (step 32), and generating invoices based on the electronic contract and the bill of work (step 34).

MRO management system 10 shown in FIG. 1 is capable of carrying out functions for generating an electronic contract based on a bill of work including maintenance tasks to be performed on an aircraft (step 20). Generating an electronic contract (step 20) may include retrieving data related to the maintenance tasks in the bill of work from an external production control system configured to electronically manage execution of the bill of work. Because the electronic contract is based on the bill of work including a number of maintenance tasks, generating the contract may include acquiring data about the tasks in the bill of work. Although the data may be manually input into MRO management system 10 from, for example, paper based maintenance task cards; it is more efficient to retrieve electronic data related to the tasks already input into, for example, an external electronic system. The aircraft owner, e.g. an airline, may employ a production control system to manage execution of the bill of work during a maintenance visit for the aircraft. Whether a heavy maintenance or line maintenance check, the production control system generally manages planning and scheduling a bill of work including a number of maintenance tasks, prioritizing the maintenance tasks, tracking the maintenance tasks during execution of the bill of work, validating the performance of each of the tasks, and releasing the aircraft upon completion of the bill of work. An example production control system that may be employed to manage execution of line maintenance on an aircraft and from which data related to the maintenance tasks may be retrieved during generation of the electronic contract (step 20) is described in U.S. patent application Ser. No. 12/080,901 by Dinakara et al., filed Apr. 7, 2008 and entitled "LINE MAINTENANCE MANAGER."

The electronic contract generated based on the bill of work (step 20) may include a number of terms including labor terms for the maintenance tasks in the bill of work, additional terms related to non-labor based services, and amendments that group one or more of the tasks in the bill of work. Labor terms for each of the maintenance tasks may include a labor rate, which may be set by the hour or as a flat rate per task. Additionally, labor terms may include a number of hours to complete the maintenance task and a type of billing including fixed or non-fixed hourly. Fixed hourly billing prescribes that the maintenance task be completed within a specified number of hours, while non-fixed billing places no maximum limit on the number of hours spent on the task. The electronic contract may also contain terms related to non-labor based services including, for example, invoicing terms related to the types and the number of invoices generated during the execution of the bill of work, material and tooling price mark-ups, and handling fees. Handling fees may include fees related to storing and transporting materials and tooling required for executing the bill of work. Special pricing packages may be captured in the electronic contract by adding amendments that group one or more maintenance tasks. Using amendments, pricing arrangements may be pre-established for different maintenance visit types or maintenance environments including, for example, a pricing package and defined set of tasks for a particular engineering order or an engine change. Each of the amendments may include, for example, labor terms and additional terms related to non-labor based services for the maintenance tasks grouped in the amendment, and contractual clauses governing performance of the amendment.

Prior to or after approving the electronic contract generated (step 20) by system 10, an MRO company may wish to estimate revenue generated by and optimize resource utilization on the bill of work. System 10 may therefore generate a revenue estimate for the bill of work based on the electronic contract (step 22) and analyze MRO resources to increase utilization on the bill of work (step 24). Generating a revenue estimate for the bill of work (step 22) may include determining labor hours required per unit time, determining skill specific labor hours required per unit time by skill level required, analyzing any non-labor based services included in the electronic contract, and calculating the revenue estimate including at least the sum of total labor fees and total non-labor fees. System 10 may also calculate an estimated profit margin for the bill of work that is approximately equal to the sum of total labor fees and total non-labor fees minus the sum of total labor costs and total non-labor costs. The estimated profit margin may be used as a basis for deciding whether or not to approve the electronic contract, which will be discussed in greater detail below.

Analyzing MRO resources to increase utilization on the bill of work (step 24) may include comparing available labor hours to labor hours required for the bill of work by skill level required, and comparing available facility resources to facility resources required for the bill of work. For example, system 10 may compare available maintenance locations and equipment to the location and equipment requirements of the bill of work. The bill of work may be executed at one or more stations (airports) to which the MRO has access. Within each station there commonly will be a number of hangars, ramps, and gates from which system 10 may choose as an appropriate location for executing of the bill of work. Finally, at each specific location there may be a set of maintenance equipment readily available, which system 10 may use as criteria for choosing the maintenance location best suited for the requirements of the bill of work.

Prior to or after generating a revenue estimate for the bill of work (step 22) and analyzing MRO resources to increase utilization on the bill of work (step 24), system 10 may approve the electronic contract (step 26). Access to MRO management system 10 may be provided both to the MRO, as well as the MRO's customers, e.g. the airline that owns the aircraft on which the bill of work is executed. After the electronic contract has been generated (step 20), and prior to or after generating the revenue estimate (step 22) and analyzing MRO resources (step 24), system 10 may approve the electronic contract (step 26) by, for example, receiving electronic signatures from authorized personnel working for the MRO and/or the airline.

In addition to approving the electronic contract (step 26), system 10 functions to report progress of execution of the bill of work (step 28). Reporting progress of execution of the bill of work (step 28) may include interfacing with an external production control system configured to electronically manage execution of the bill of work, generating reports based on the execution of the bill of work and the electronic contract, and outputting the reports to an electronic device. As discussed above with reference to the step of generating an electronic contract (step 20), the aircraft owner, e.g. an airline, may employ a production control system to manage execution of the bill of work during a maintenance visit for the aircraft. An MRO may leverage the information and processing capabilities of the aircraft owner's production control system. For example, system 10 may interface with the production control system to retrieve from or query the system for data related to the ongoing execution of the bill of work.

In addition to interfacing with the production control system, reporting execution of the bill of work (step 28) may include generating reports based on the execution of the bill of work and the electronic contract. The reports generated by system 10 may include a variety of performance metrics organized by, for example, station, aircraft, bill of work, and maintenance task. An example report may be generated for an entire airline including a number of stations, each of which may include a number of aircraft undergoing maintenance. Performance metrics included in the report may be generated at the station and the aircraft level. For example, for each station, the report may include the total planned maintenance days versus the total actual maintenance days for a given period of time. Additionally, the report may include the total number of early and late days for all the maintenance bills of work executed during a given period of time. Other performance metrics at the station level may be a measure of on-time performance and a percent utilization of MRO resources. An alternative report or additional metrics included in the aforementioned report, may organize year to date performance for each station by listing metrics by bay number, bill of work, and/or aircraft. For example, the report may include, for each station, a list of bills of work, the bay at which they are being or were performed, and the aircraft on which they are being or were executed. Each of the bills of work/bays/aircraft may be associated with metrics including planned versus actual delivery date of the aircraft from maintenance, a revised planned delivery date, and a percent completion for the entire bill of work being executed on the aircraft.

Reports generated for a single station or aircraft may include metrics down to the individual maintenance task level. For example, for each aircraft at a particular station or for a single aircraft, an example report may include the total number of routine and non-routine tasks, the number of open and closed routine and non-routine tasks, and an aggregate percent completion for routine and non-routine tasks. Additional task level detail may be provided by, for example, organizing routine tasks into different categories based on the type of maintenance task involved. The report may also include critical path tasks and notes and potential delays related to these tasks. During maintenance on an aircraft, some maintenance tasks may be dependent on others for their completion. A simple example is where task B may not be started, let alone completed, until task A is completed. If task A is delayed, task B is also necessarily delayed. In some cases, dependencies between tasks may cascade through a bill of work and act to delay the completion of the entire bill of work beyond a planned delivery date. In order to reduce the risk of such costly delays, system 10 may identify and report metrics related to such critical path tasks. The reports may also include performance metrics related to estimated, actual, and remaining labor hours, which may be organized by skill including, for example, avionics, engine, machine, sheet metal, upholstery, utility, or other skill categories. The reports may also include metrics related to the ordering and installation/utilization of materials and tooling needed for executing the bill of work on an aircraft.

After generating the reports, system 10 may output the reports to an electronic device by, for example, displaying the reports on a monitor and printing hardcopies of the reports. System 10 may also export the reports to a computer readable medium in a variety of data formats. For example, system 10 may export a report to a disk drive in .csv, .xls, .txt, .html, or another appropriate data format.

In addition to reporting progress of execution of the bill of work (step 28), system 10 also processes changes to the electronic contract necessitated by the execution of the bill of work (step 30). Processing changes to the electronic contract (step 30) may include editing the electronic contract based on the execution of the bill of work and approving one or more changes to the electronic contract. Many factors may affect the execution and the scope of the bill of work, and thereby the associated terms of the electronic contract agreed upon by personnel from the MRO and the aircraft owner. As such, system 10 is configured to process changes to the electronic contract necessitated by the execution of the bill of work (step 30). For example, during the execution of tasks originally included in the bill of work several issues arise that necessitate additional tasks that were not planned or accounted for in the contract generated (step 20) by system 10 and agreed to by the MRO and aircraft owner. The electronic contract may therefore be edited to add the unplanned tasks and, if necessary, set any labor and non-labor terms specific to the added tasks. In some cases, the addition of unplanned tasks may affect the timeline for executing the entire bill of work, which in and of itself may necessitate additional changes to the electronic contract including, for example, the delivery date of the aircraft from the maintenance check. In addition to unplanned tasks necessitating changes to the electronic contracts, additional materials and tooling may be needed to complete a task or the terms of a task, such as total planned labor hours, may need to be adjusted due to unforeseen circumstances. After the electronic contract is edited, the changes to the contract may be approved. System 10 may approve changes to the contract by, for example, receiving electronic signatures from one or both of personnel from the MRO and the aircraft owner.

In addition to processing changes to the electronic contract (step 30), system 10 may also approve completion of one or more of the tasks in the bill of work and compliance with one or more of the terms in the contract. During and/or after execution of the bill of work, the airline may require a validation process for completing tasks in the bill of work and complying with terms of the electronic contract. For example, the airline may wish to sign-off on each task as it is closed. System 10 may approve completed tasks by, for example, receiving an electronic signature from airline personnel after they have reviewed the task and conducted any necessary or required inspections. Additionally, the airline may wish to approve compliance with the terms of the electronic contract. Approving contract terms may include, for example, reviewing the original contracted to labor terms and any, for example, tasks or labor hours added during execution of the bill of work. The final labor terms with any necessary adjustments may then be approved by, for example, receiving an electronic signature from authorized airline personnel. In addition to labor terms, non-labor terms, amendments, and invoices may be approved in system 10. For example, an invoice generated by system 10 may be reviewed and approved by the airline prior to sending it to billing.

System 10 may also be configured to manage materials and tooling required for the execution of the bill of work. Larger MRO companies may already employ an external supply chain management system, in which case system 10 may manage materials and tooling required for the execution of the bill of work by, for example, interfacing with such external supply chain management systems that are generally configured to manage material and tooling orders, inventory, repairs, and costs. However, in the event the MRO does not employ a supply chain management system, system 10 may be configured to provide some basic functions for material and tooling management. For example, system 10 may be configured to manage an inventory of materials, order materials, as necessary, for the execution of the bill of work, associate materials with the maintenance tasks in the bill of work, and track the location and utilization of the materials during the execution of the bill of work. Similarly, with respect to tooling, system 10 may be configured to manage an inventory of tools, search an electronic repository (including an electronic database or another electronic storage and retrieval mechanism) for tools necessary for the execution of the bill of work, order tools, as necessary, for the execution of the bill of work, associate the tools with the maintenance tasks in the bill of work, determine the repair status of the tools, and track the location and utilization of the tools during the execution of the bill of work.

As discussed above, system 10 is configured to report progress of execution of the bill of work (step 28). Reporting progress of the bill of work provides real time electronic access to the maintenance work being performed on the aircraft by displaying or otherwise outputting performance metrics related to the work. In addition to reporting progress of execution of the bill of work (step 28), system 10 may also be configured to analyze the execution of the bill of work to produce one or more performance metrics (step 32). While reporting progress (step 28) provides visual access to the maintenance work being performed, analyzing the bill of work (step 32) provides data that may be used to improve the efficiency, profitability, or both of the bill of work during execution or to make such improvements by applying lessons learned to future maintenance checks. The performance metrics produced from the analysis of the bill of work (step 32) include, for example, available labor hours versus labor hours used on the bill of work, estimated revenue versus actual revenue, estimated profit margin versus actual profit margin, percent utilization of available MRO facilities, percent utilization of available materials, percent utilization of available tooling, and estimated completion time versus actual completion time for one or more of the maintenance tasks in the bill of work.

In addition to analyzing the execution of the bill of work (step 32), system 10 is also configured to generate invoices based on the electronic contract and the bill of work (step 34). System 10 may be configured to automatically or through user interaction generate invoices before, during, and after execution of the bill of work. The number and type of invoices generated (step 32) by system 10 may generally be governed by the terms of the electronic contract. For example, the contract may require a certain number of invoices at different milestones during the course of execution of the bill of work. System 10 may be configured to generate a number of standard invoices in association with the electronic contract. For example, system 10 may generate an "input" invoice to be transmitted from the MRO to the airline at the time the aircraft is brought in for maintenance. Additionally, system 10 may generate "interval" and "additional" invoices during execution of the bill of work on the aircraft. Interval invoices are invoices generated at particular milestones during execution of the bill of work that are agreed to by the MRO and the airline in the electronic contract. Additional invoices are ad-hoc invoices generated as needed during execution of the bill of work to, for example, account for changes made to the scope of work, and thereby the electronic contract. System 10 may also generate a "final" invoice at the completion of the bill of work. In addition to these standard invoices, system 10 may also generate general invoices that are outside the terms of the electronic contract. The MRO may already employ an electronic billing system, such as electronic billing systems manufactured by SAP of Walldorf, Germany, and system 10 may therefore be configured to exchange billing and invoicing information with such a system.

Figure 3:
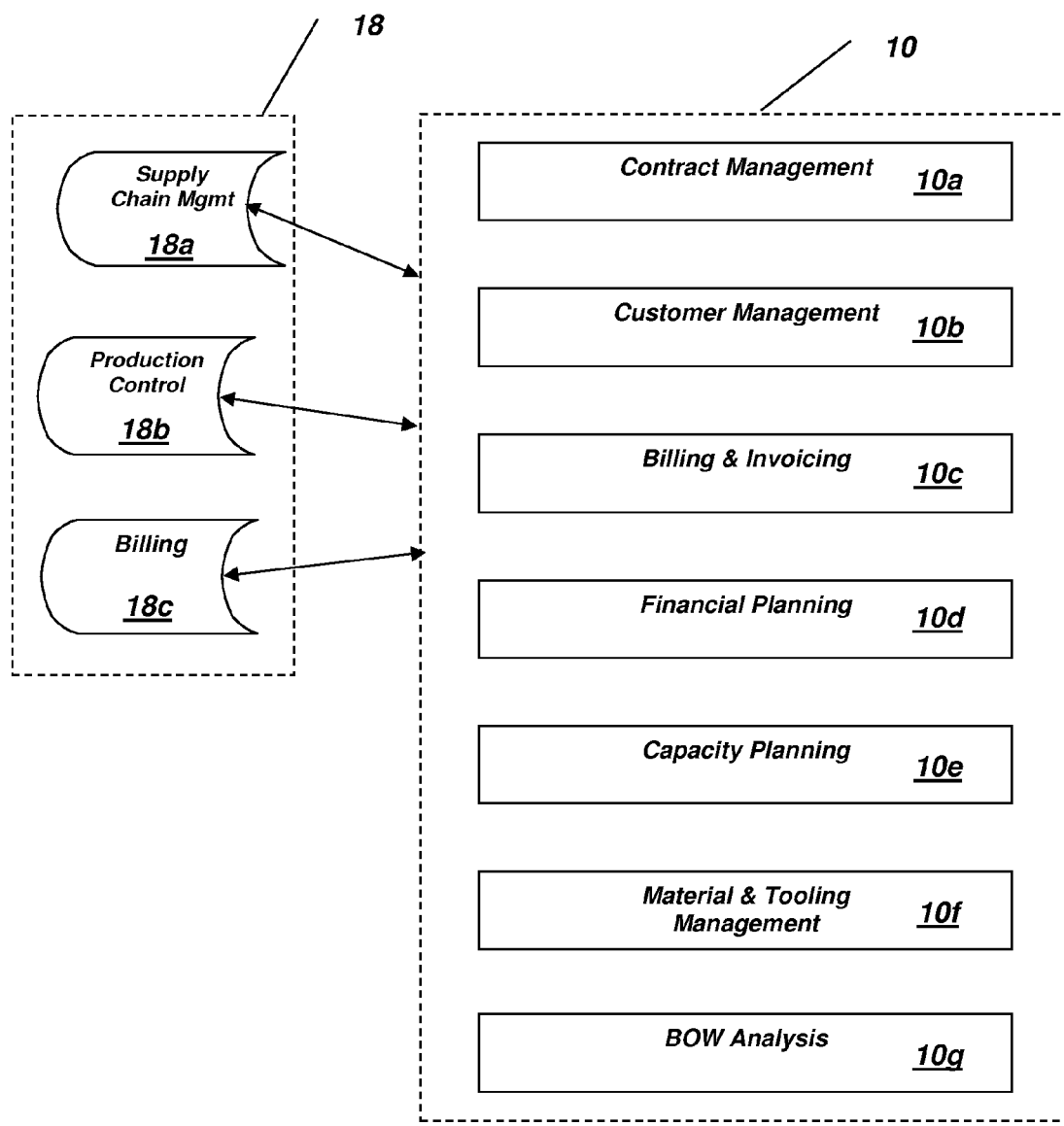
FIG. 3 is a diagram illustrating an embodiment of the MRO management system of FIG. 1.

FIG. 3 is a diagram illustrating one implementation of MRO management system 10 of FIG. 1 including contract management component 10*a*, customer management component 10*b*, billing and invoicing component 10*c*, financial planning component 10*d*, capacity planning component 10*e*, and material and tooling management component 10*f*, and BOW analysis component 10*g*. In FIG. 3, MRO management system 10 interfaces with a number of external electronic systems 18 including materials and tooling 18*a*, production control 18*b*, and billing 18*c* systems.

Contract management component 10*a* is configured to generate and approve, edit, and archive an electronic contract based on a bill of work for an aircraft maintenance check. MRO and airline personnel may use contract management component 10*a* to create and agree on electronic contracts associated with bills of work for maintenance checks of various aircraft. For example, MRO management may use component 10*a* to generate an electronic contract by entering terms associated with the maintenance tasks in a bill of work. In the event that a particular bill of work is similar to past work performed by the MRO, prior contracts and/or terms may be applied consistently by, for example, retrieving and reviewing past electronic contracts or using contract templates as a starting point for generating the electronic contract. The MRO may then use other components of system 10, such as financial and capacity planning components 10*d*, 10*e* to determine the desirability of the terms of the electronic contract and thereby the execution of the bill of work for the airline. For example, financial planning component 10*d* may be used to generate a revenue estimate for the bill of work by, for example, determining labor hours required per unit time and skill specific labor hours required per unit time by skill level required, and analyzing any non-labor based services included in the electronic contract. From these labor and non-labor services the revenue from the bill of work may be calculated by adding the MRO fees for the services provided in the contract. Financial planning component 10*d* may also be used to estimate the profit margin for the bill of work by, for example, calculating the sum of total labor fees and total non-labor fees minus the sum of total labor costs and total non-labor costs. Revenues and profit margin may be an important factor in deciding whether to perform the bill of work for the airline.

In addition to financial planning component 10d, the MRO may employ capacity planning component 10*e* to determine the feasibility of performing the bill of work based on available MRO resources, as well as to increase utilization of these resources by assigning them efficiently between multiple maintenance jobs (e.g. bills of work). For example, capacity planning component 10*e* may be used to compare available labor hours and facility resources to labor hours and facility resources required for the bill of work. Comparing available to required facility resources may include, for example, comparing which MRO maintenance locations, e.g. stations, hangars, ramps, and gates, and equipment are available to specific location and equipment requirements dictated by the bill of work. Once the MRO has determined that the contract terms, taking into account financial and capacity planning, are favorable, the electronic contract may be communicated to airline personnel through contract management component 10*a* for approval. After reviewing the electronic contract in, for example, an Internet browser running a secure web application, airline personnel may approve the contract by providing one or more electronic signatures to be associated and stored with the contract. The contract generation and approval process may, of course, be iterative during which the airline and MRO go through several versions of the contract before agreeing on final terms for performing the bill of work.

Customer management component 10b is configured to generate and output one or more reports based on execution of the bill of work, process changes to the electronic contract necessitated by the execution of the bill of work. Customer manger component 10b may also process electronic approvals including, for example, approvals of the original electronic contract or specific terms within the contract, changes to the contract as a whole and to specific terms of the contract, as well as approving invoices as they are generated by system 10 and approving completion of tasks in the bill of work and compliance with terms of the electronic contract.

During execution of the bill of work several key features for reporting progress of and for processing changes to the electronic contract are provided by customer management component 10b of system 10. For example, MRO and airline personnel may wish to monitor progress of the execution of the bill of work or a number of bills of work being executed simultaneously. Customer management component 10b therefore provides real-time reports on the progress of maintenance work being performed on one or more aircrafts at one or more locations. The reports may be viewed through, for example, an Internet browser running a secure web application, or, alternatively, the reports may be exported from system 10 in a variety of data formats to be used in another system or to be stored on computer readable medium. Hard copies of any of the reports may also be printed. The reports include various performance metrics, which may be presented at, for example, a company level, e.g. all airline aircraft currently undergoing maintenance, a station level, e.g. all aircraft undergoing maintenance at a particular station (airport), a bill of work level, or even down to individual maintenance tasks. Reports generated by customer management component 10b may include performance metrics created from data housed in an external electronic system. For example, component 10b may interface with production control system 18b to retrieve from or query system 18b for data related to the ongoing execution of the bill of work.

In addition to reporting progress of the execution of the bill of work, the customer management component 10b functions to process changes to the electronic contract necessitated by the execution of the bill of work. As unforeseen circumstances arise during a maintenance check on an aircraft, changes may be made to the scope of the bill of work and to the terms of the electronic contract. For example, the specific labor or non-labor terms of an existing task may be changed or new tasks may be added and contract terms agreed to for the added tasks. MRO and airline personnel may use customer management component 10b to create, view, edit, and approve changes to the electronic contract.

Billing and invoicing component 10c is configured to automatically generate one or more invoices based on the electronic contract and exchange billing and invoicing information with external billing system 18c. Billing and invoicing component 10c may be configured to automatically or through user interaction generate invoices before, during, and after execution of the bill of work. The number and type of invoices generated may generally be governed by the terms of the electronic contract and component 10c may be configured to generate a number of standard invoices in association with the electronic contract. For example, an "input" invoice may be generated at the time the aircraft is brought in for maintenance, "interval" and "additional" invoices may be generated during execution of the bill of work on the aircraft, and a "final" invoice may be generated at the completion of the bill of work. Billing and invoicing component may also generate general invoices that are outside the terms of the electronic contract and may be configured to exchange billing and invoicing information with external electronic billing system 18c.

Material and tooling management component 10f is configured to manage inventor and ordering of tools and materials required for executing the bill of work and to track the tools and materials during execution of the bill of work. Material and tooling management component 10f may act simply as an interface between system 10 and a sophisticated external supply chain management system 18a. In the event the MRO does not employ a separate supply chain management system, however, component 10f provides basic inventory management, order execution and tracking, and tooling and material location and utilization tracking.

In order to improve the execution of the bill of work or to apply lessons learned from a past maintenance check, system 10 includes BOW Analysis component 10g. BOW analysis component 10g is configured to analyze the execution of the bill of work to produce one or more performance metrics. The performance metrics, which may include, for example, available labor hours versus labor hours used on the bill of work, estimated revenue versus actual revenue, and estimated profit margin versus actual profit margin, may be used as a basis for improving the execution of the current bill of work or execution of one or more other future bills of work.

Figure 4:
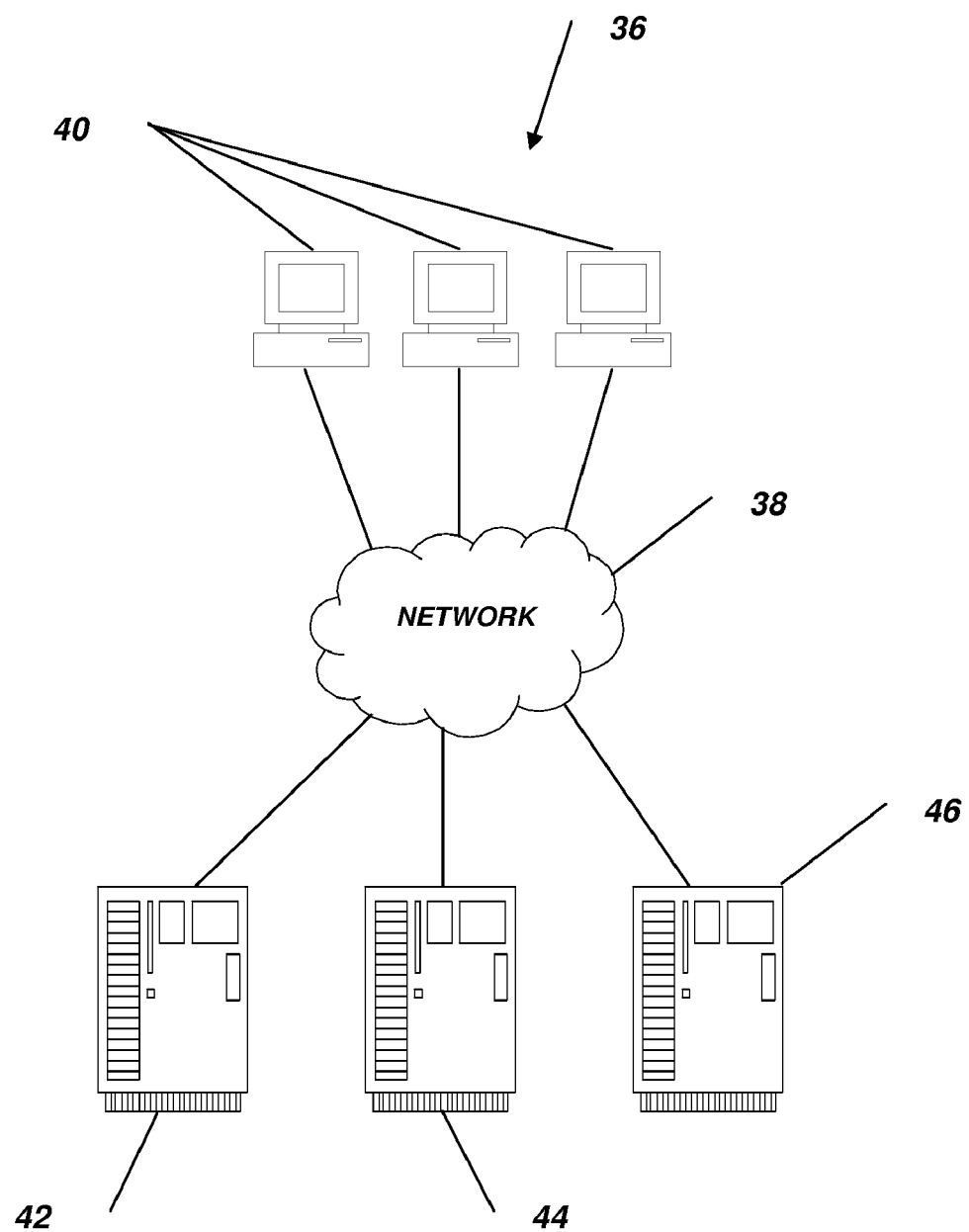
FIG. 4 is a schematic diagram illustrating a distributed computing network configured to store and process the MRO management system illustrated in FIGS. 1-3.

MRO management system 10, and in some embodiments external systems 18, may be stored and processed on a single computer or may be distributed across more than one computer. For example, FIG. 4 is a schematic diagram illustrating a distributed computing network 36 configured to store and process MRO management system 10 and external systems 18. Computing network 36 includes network cloud 38, user terminals 40, first server 42, second server 44, and third server 46. Network cloud 38 may be a private or public network infrastructure including, for example, a corporate LAN or WAN or the Internet configured to connect user terminals 40 and first, second, and third servers 42-46. Network cloud 38 may include wired and/or wireless connections configured to transmit data using one or more communications protocols, such as IP or ATM. Computing network 36 also includes user terminals 40 through which one or more users may access and use MRO management system 10. User terminals 40 each may include, for example, a computer configured with an operating system, such as Windows, Macintosh, or LINUX, a monitor, and input devices, such as a keyboard, a mouse, a stylus or some combination thereof. User terminals 40 may include desktop or laptop computers, as well as handheld devices, such as a Personal Data Assistant (PDA). Computing network 36 includes first, second, and third servers 42-46, which may be, for example, configured to store and process MRO management system 10 and two external systems 18 respectively.

Embodiments according to the present invention provide MRO companies solutions for automating and thereby increasing the efficiency of executing aircraft maintenance checks. MRO management methods and systems according to the present invention provide functions for generating electronic contracts based on a bill of work, reporting progress of execution of the bill of work, processing changes to contract terms and the scope of work necessitated by the execution of the bill of work, and automatically generating invoices before, during and after the execution of the bill of work. Embodiments of the present invention may be configured to interface with external production control systems employed by airlines, as well as supply chain management and billing systems already employed by the MRO. Methods and systems according to the present invention may also provide functions for financial and capacity planning to assist in generating the electronic contract and distributing MRO resources efficiently across multiple maintenance contracts. Finally, embodiments of the present invention provide tools to analyze the execution of bills of work to produce performance metrics, which may be used as a basis for improving the execution of a current or future aircraft maintenance visit.

Although the present invention has been described with reference to particular embodiments, workers skilled in the art will recognize that changes may be made in form and detail without departing from the scope of the invention as defined in the claims that follow.

The invention claimed is:

1. A computer implemented method of managing maintenance, repair, and overhaul (MRO) of an aircraft, the method comprising:
   generating an electronic contract with a computer system, the electronic contact based on a bill of work comprising a plurality of maintenance tasks to be performed on the aircraft;
   generating an electronic progress report with the computer system, the progress report reporting progress of execution of the bill of work;
   processing with the computer system, as necessary, one or more changes to the electronic contract necessitated by the execution of the bill of work; and
   generating one or more invoices with the computer system, the invoices based on the electronic contract and the bill of work.

2. The method of claim 1, wherein generating the electronic contract comprises retrieving data related to the bill of work and the maintenance tasks from an external production control system configured to electronically manage execution of the bill of work.

3. The method of claim 1, wherein the electronic contract comprises one or more of:
   labor terms for one or more of the maintenance tasks in the bill of work;
   additional terms related to non-labor based services; and
   amendments that group one or more of the maintenance tasks in the bill of work.

4. The method of claim 3, wherein the labor terms comprise one or more of labor rate per hour or per task, number of hours, and fixed or non-fixed hourly billing.

5. The method of claim 3, wherein the additional terms comprise one or more of invoicing terms related to types and number of invoices generated during the execution of the bill of work, material and tooling price mark-ups, and handling fees.

6. The method of claim 5, wherein the handling fees comprise one or more of material and tooling storage and transportation fees.

7. The method of claim 3, wherein each amendment comprises one or more of:
   labor terms for each of the maintenance tasks grouped in the amendment;
   additional terms related to non-labor based services for the maintenance tasks in the amendment; and
   one or more contractual clauses governing performance of the amendment.

8. The method of claim 1 further comprising generating a revenue estimate for the bill of work based on the electronic contract.

9. The method of claim 8, wherein generating the revenue estimate comprises:
   determining labor hours required per unit time;
   determining skill specific labor hours required per unit time by skill level required;
   analyzing any non-labor based services included in the electronic contract; and
   calculating the revenue estimate, which estimate comprises at least the sum of total labor fees and total non-labor fees.

10. The method of claim 9 further comprising calculating an estimated profit margin for the bill of work that is approximately equal to the sum of total labor fees and total non-labor fees minus the sum of total labor costs and total non-labor costs.

11. The method of claim 10 further comprising approving the electronic contract based, at least in part, on the estimated profit margin.

12. The method of claim 11, wherein approving the electronic contract comprises receiving one or more electronic signatures.

13. The method of claim 1 further comprising analyzing one or more MRO resources to increase utilization on the bill of work.

14. The method of claim 13, wherein analyzing one or more MRO resources comprises:
   comparing available labor hours to labor hours required for the bill of work by skill level required; and
   comparing available facility resources to facility resources required for the bill of work.

15. The method of claim 14, wherein comparing available facility resources to facility resources required for the bill of work comprises comparing available to required maintenance locations and maintenance equipment.

16. The method of claim 15, wherein maintenance locations comprise one or more of station hangars, ramps, and gates.

17. The method of claim 1 further comprising receiving one or more electronic signatures to approve the electronic contract.

18. The method of claim 1, wherein reporting progress of execution of the bill of work comprises:
   generating one or more reports based on the execution of the bill of work and the electronic contract; and
   outputting the reports to an electronic device.

19. The method of claim 18, wherein outputting the reports to an electronic device comprises one or more of:
   displaying one or more of the reports on a monitor;
   exporting one or more of the reports to a computer readable medium in one or more data formats; and
   printing one or more of the reports.

20. The method of claim 18, wherein the reports comprise one or more performance metrics organized by one or more of station, aircraft, bill of work, and maintenance task.

21. The method of claim 18 further comprising interfacing with an external production control system configured to electronically manage execution of the bill of work.

22. The method of claim 1, wherein processing changes to the electronic contract necessitated by the execution of the bill of work comprises:
   editing the electronic contract based on the execution of the bill of work; and
   approving the changes to the electronic contract.

23. The method of claim 22 further comprising approving completion of one or more of the tasks in the bill of work and compliance with one or more of the terms in the electronic contract.

24. The method of claim 1 further comprising managing materials and tooling required for the execution of the bill of work.

25. The method of claim 24, wherein managing materials required for the execution of the bill of work comprises one or more of:
- managing an inventory of materials;
- ordering materials, as necessary, for the execution of the bill of work;
- associating one or more of the materials with one or more of the maintenance tasks in the bill of work; and
- tracking a location and a utilization of one or more of the materials during the execution of the bill of work.

26. The method of claim 24, wherein managing tooling required for the execution of the bill of work comprises one or more of:
- managing an inventory of tools;
- searching an electronic repository for tools necessary for the execution of the bill of work;
- ordering tools, as necessary, for the execution of the bill of work;
- associating one or more tools with one or more of the maintenance tasks in the bill of work;
- determining a repair status of one or more of the tools; and
- tracking a location and a utilization of one or more of the tools during the execution of the bill of work.

27. The method of claim 24, wherein managing materials and tooling required for the execution of the bill of work comprises interfacing with one or more external supply chain management systems configured to manage material and tooling orders, inventory, repairs, and costs.

28. The method of claim 1 further comprising analyzing the execution of the bill of work to produce one or more performance metrics.

29. The method of claim 28, wherein the performance metrics comprise one or more of available labor hours versus labor hours used on the bill of work, estimated revenue versus actual revenue, estimated profit margin versus actual profit margin, percent utilization of available MRO facilities, percent utilization of available materials, percent utilization of available tooling, and estimated completion time versus actual completion time for one or more of the maintenance tasks in the bill of work.

30. The method of claim 1, wherein generating one or more invoices based on the electronic contract and the bill of work comprises exchanging billing and invoicing information with an external electronic billing system.

31. An electronic system for managing maintenance, repair, and overhaul (MRO) of an aircraft, the system comprising:
- a contract management component configured to generate and approve, edit, and archive an electronic contract based on a bill of work for an aircraft maintenance check;
- a customer management component configured to generate and output one or more reports based on execution of the bill of work, and process changes to the electronic contract necessitated by the execution of the bill of work; and
- a billing and invoicing component configured to automatically generate one or more invoices based on the electronic contract and exchange billing and invoicing information with an external billing system.

32. The system of claim 31 further comprising a financial planning component configured to generate one or more revenue estimates and calculate one or more estimated profit margins for executing the bill of work.

33. The system of claim 31 further comprising a capacity planning component configured to determine availability of one or more MRO resources required for executing the bill of work and to analyze all MRO resources to increase utilization on one or more bills of work.

34. The system of claim 31 further comprising a material and tooling management component configured to manage inventor and ordering of tools and materials required for executing the bill of work and to track the tools and materials during execution of the bill of work.

35. The system of claim 31 further comprising a bill of work analysis component configured to analyze the execution of the bill of work to produce one or more performance metrics for use in improving the execution of the bill of work or execution of one or more other bills of work.

* * * * *